S. CORSE.
Car-Starter.
No. 165,309.
Patented July 6, 1875.
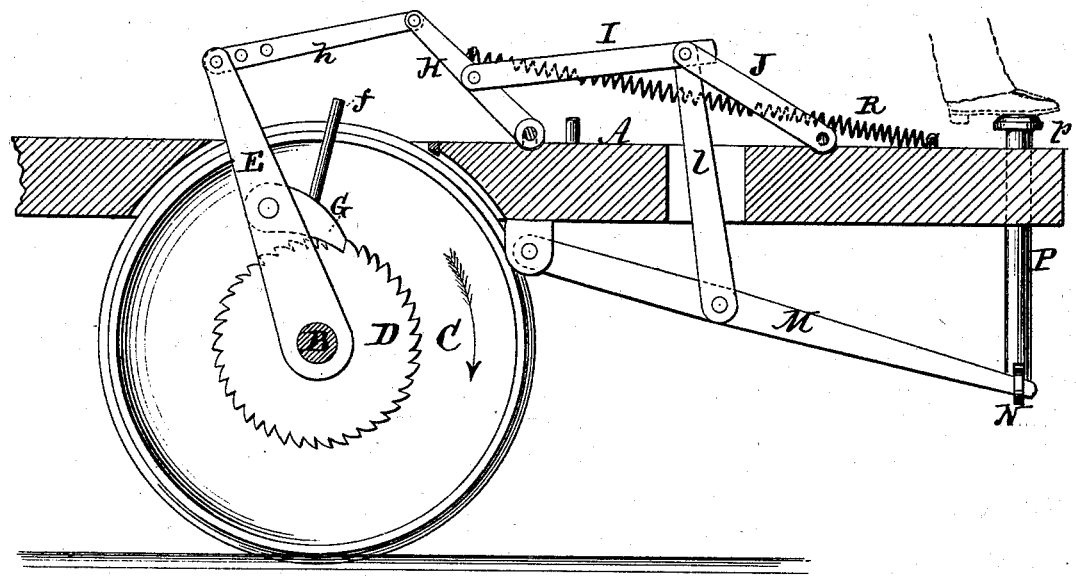
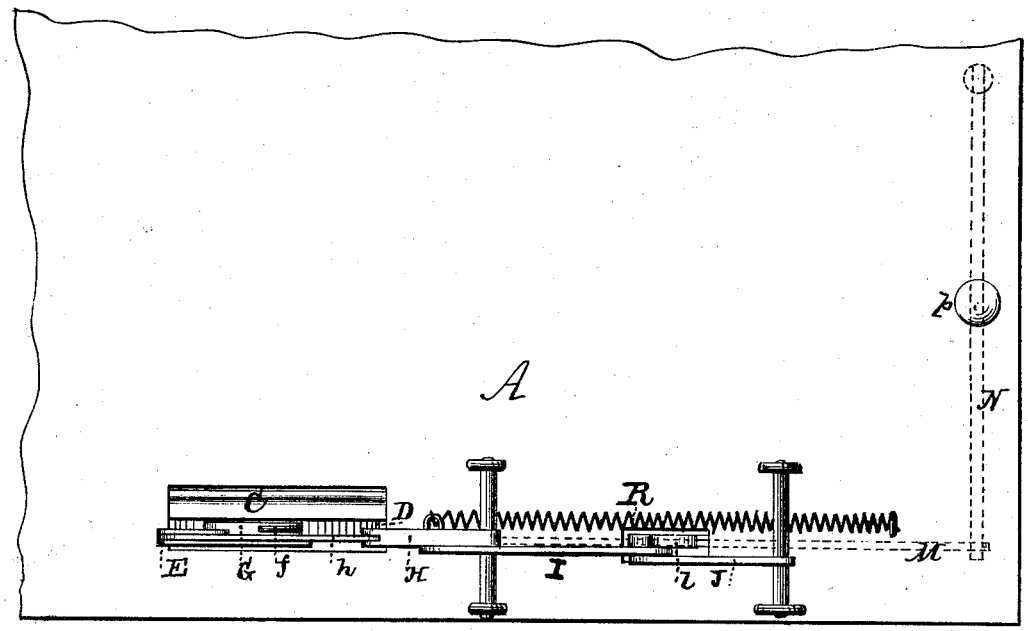
Witnesses:
Michael Ryan
Fred Haynes
S. Corse
by his Attorneys
Brown & Allen

UNITED STATES PATENT OFFICE.

SAMUEL CORSE, OF NEW YORK, N. Y.

IMPROVEMENT IN CAR-STARTERS.

Specification forming part of Letters Patent No. 165,309, dated July 6, 1875; application filed June 11, 1875.

*To all whom it may concern:*

Be it known that I, SAMUEL CORSE, of the city, county, and State of New York, have invented certain Improvements in Starting Mechanism for Cars and other Vehicles; and I do hereby declare that the following is a full, clear, and exact description of the same, reference being had to the accompanying drawing, which forms part of this specification.

My invention consists in a novel arrangement and combination of a series of levers, a spring, and a pawl-and-ratchet mechanism, whereby the driver is enabled to apply power to the wheels to assist the team in starting the vehicle, as hereinafter particularly described.

In the accompanying drawing, Figure 1 is a side view, showing the application of my invention to a street-car. Fig. 2 is a top view of the same.

A represents a portion of the floor of a car; B, the axle, and C the wheel. To the axle B, or one of the wheels C, a ratchet, D, is attached in any suitable manner. The axle B passes through the lower end of, and forms the fulcrum for, a lever, E, so as to allow said lever to oscillate in a vertical plane in a direction longitudinally of the car. To the lever E is pivoted a pawl, G, arranged to engage with the ratchet D by its own weight when the lever E is thrown backward, and provided with an upwardly-projecting arm, $f$, for disengaging it from the ratchet when the lever is moved forward. A lever, H, has its lower end pivoted to the floor A, and its upper end is connected to the upper end of the lever E by means of a rod or link, $h$. About midway of the length of the lever H is pivoted one end of a toggle-lever, I, the other end of which extends forward and upward, and is pivoted to the upper end of another toggle-lever, J, the lower end of which is pivoted to the floor A. The inner ends of the toggle-levers are connected, by a rod or link, $l$, with a lever, M, the rear end of which is pivoted to the under side of the floor A, and the front end extends forward longitudinally of the car, and connects with one end of a lever, N, which extends transversely of the car, and has its other end pivoted to the under side of the floor or platform. To the transverse lever N is connected the lower end of a bar, P, which passes through and extends upward above the platform, and is provided with a foot-piece, $p$. To the lever H is attached one end of a powerful spring, R, the other end of which is attached to the floor A. The lever E and pawl G, and the rod or link $l$, work in slots in the floor.

When it is desired to start the car the driver presses down the bar P with his foot, by which means the levers N M are depressed, the toggle-levers I J are drawn down, the levers H E are thrown back, the pawl G is thrown into engagement with the ratchet D, and the spring R is expanded, the parts assuming the position shown in Fig. 1. When the driver removes the pressure from the bar P the spring R contracts, throwing all the parts into their former position, and, by the engagement of the pawl and ratchet, causing the wheels to revolve, and thus assist the team in starting the car. Upon reaching the former position the arm $f$ strikes the end of the slot in which the lever E works, and is thrown out of engagement with the ratchet.

When the car is intended to run both ways another set of the mechanism is applied to the other axle, and the pawl is provided with means for holding it out of engagement with the ratchet, so as to allow the wheels to turn in the opposite direction.

The spring R is made strong enough to enable it to start the wheels, as above described; and by the arrangement of the levers and connections, as shown, the driver is enabled to exert sufficient power to overcome the strength of the spring so far as to expand it to the extent required to throw the pawl into engagement with the ratchet at the proper point. The power may be still further increased by the use of a lever bearing upon the bar P.

If desired, the bar P may be surrounded by a coiled spring to assist the parts in recovering their first position, and also to co-operate with the spring R in starting the wheels.

The ratchet may be placed on either side of the wheel, as may be preferred. The parts which are above the floor are covered by the seat of the car, and thus are out of the way and protected from injury.

What I claim as new, and desire to secure by Letters Patent, is—

1. The combination, with the pawl G and ratchet D, of the levers E H, connecting-link h, toggle-levers I J, connecting-link l, levers M N, and foot-bar P, arranged and operating as shown and described, for the purpose specified.

2. The combination of the ratchet D, pawl G, levers E H, and their connecting-link, and the spring R, as shown and described, for the purpose specified.

SAMUEL CORSE.

Witnesses:
 MICHAEL RYAN,
 FRED. HAYNES.